United States Patent [19]
Tani et al.

[11] 3,850,667
[45] Nov. 26, 1974

[54] SYNTHETIC PAPER AND PROCESS

[75] Inventors: Kaneyasu Tani; Shozo Imoto; Shiro Kawazoe, all of Tokyo; Wachio Ichihara, Kawaguchi; Tatsuhiko Nagai, Tokyo; Hiroaki Noguchi, Ageo, all of Japan; Bunkichi Yamada, deceased, late of Katsuta, Japan; by Fumiko Yamada, legal representative, Katsuta, Japan

[73] Assignee: Nippon Kakoh Seishi Kabushiki Kaisha, Tokyo, Japan

[22] Filed: June 29, 1972

[21] Appl. No.: 267,341

Related U.S. Application Data

[63] Continuation of Ser. No. 42,584, June 1, 1970, abandoned, which is a continuation-in-part of Ser. Nos. 610,481, Jan. 20, 1967, Pat. No. 3,515,567, and Ser. No. 789,941, Jan. 8, 1969, abandoned, each is a continuation-in-part of Ser. No. 596,083, Nov. 22, 1966, abandoned.

[30] Foreign Application Priority Data

Nov. 27, 1965  Japan................................ 40-72486
Jan. 26, 1966  Japan................................ 41-4092
Feb. 4, 1966   Japan................................ 41-6126
Feb. 21, 1966  Japan................................ 41-10092
Feb. 23, 1966  Japan................................ 41-10512
Apr. 4, 1966   Japan................................ 41-20692
May 14, 1966   Japan................................ 41-30549

[52] U.S. Cl..................... 117/36.7, 117/47, 117/48, 117/63, 117/64
[51] Int. Cl. ........................ B41m 5/14, D21h 5/00

[58] Field of Search........... 117/63, 36.7, 47, 48, 64

[56] References Cited
UNITED STATES PATENTS

| | | | |
|---|---|---|---|
| 2,209,940 | 7/1940 | Smith................................ | 117/47 |
| 2,662,033 | 12/1953 | Andrews............................. | 117/47 |
| 2,790,727 | 4/1957 | Hilborn.............................. | 117/47 |
| 2,848,752 | 8/1958 | Bechtold............................ | 117/36.7 |
| 2,971,858 | 2/1961 | Di Giulio et al..................... | 117/7 |
| 3,100,721 | 8/1963 | Holden............................... | 117/63 |
| 3,132,983 | 5/1964 | Osborne et al..................... | 117/47 A |
| 3,135,622 | 6/1964 | Ranalli.............................. | 117/63 |
| 3,208,875 | 9/1965 | Holden............................... | 117/63 |
| 3,298,895 | 1/1967 | Plambeck........................... | 117/36.7 |
| 3,311,497 | 3/1967 | Parks................................ | 117/47 A |
| 3,384,503 | 5/1968 | Stevenson.......................... | 117/36.7 |
| 3,515,567 | 6/1970 | Tani et al........................... | 117/36.7 |
| 3,620,806 | 11/1971 | Kohne et al........................ | 117/63 |
| 3,730,667 | 5/1973 | Tani et al........................... | 117/47 A |

*Primary Examiner*—Michael Sofocleous
*Assistant Examiner*—William R. Trenor
*Attorney, Agent, or Firm*—Cooper, Dunham, Clark, Griffin & Moran

[57] ABSTRACT

Process for the production of novel synthetic paper from thermoplastic polymer films in which the surface of the films are opacified by treatment with a liquid which swells and dissolves the polymer and thereafter treating with another liquid which coagulates the polymer. Intermediate treatments are employed to improve the products.

9 Claims, No Drawings

SYNTHETIC PAPER AND PROCESS

RELATED APPLICATIONS

This is a continuation of application Ser. No. 42,584, filed June 1, 1970, now abandoned, which is continuation-in-part of copending patent applications Ser. Nos. 610,481, filed Jan. 20, 1967, now U.S. Pat. No. 3,515,567 and Ser. No. 789,941, filed Jan. 8, 1969, now abandoned, which are in turn continuation-in-part of patent application Ser. No. 596,083, filed Nov. 22, 1966, now abandoned.

BACKGROUND OF INVENTION

Many attempts have been made to use polymer films as substitutes for paper. Various procedures have been attempted to treat the polymer film, which is inherently transparent, so as to increase its opacity to the point where a mark made on its surface, whether by writing or by printing, would be visible. Attempts which have been made to attain this desirable objective have included, for example, the addition of pigments during the formation of the film, embossing the film with a rough platen after its formation, sand-blasting the surface of the film, and treating with a solvent. Despite these efforts, however, no synthetic paper product has yet been produced from plastic films having sufficient opacity to receive a visible image, sufficient bonding strength to be printed with ink which is at least of the viscosity of number 12 tack ink and yet have sufficient ink receptivity to permit high speed printing by both one color and multicolor techniques. No synthetic paper has yet been produced having the physical properties required for use as a master copy sheet for long run offset printing.

In modern high speed techniques for printing it is necessary to use highly viscous inks which transfer rapidly from the printing plate to the substrate and at the same time dry rapidly so that the image printed on the top surface of one sheet does not transfer to the back surface of the sheet just above it in the stack. The principal difficulty with synthetic papers which have heretofore been produced from plastic films is that when attempts are made to print with inks of number 12 tack or higher the surface of the synthetic paper picks or pulls away and adheres to the surface of the printing plate. Attempts to overcome this problem by decreasing the viscosity of the printing ink have led to reduced ink receptivity with resulting transfer of image.

Novel products having the required attributes for high speed printing have now been produced.

THE INVENTION

In accordance with this invention there are produced novel synthetic paper products comprising thermoplastic films having an integral opaque microporous layer on at least one surface thereof, the said layer having sufficient opacity to record a visual image, sufficient ink receptivity to be useful for high speed printing, there being sufficient bonding strength between the opaque layer and the untreated segment of the film so that it can be printed wtih ink of at least number 12 tack and remain substantially free of picking. A particular, and most unexpected advantage of the products of this invention is that they are heat and pressure sensitive and can be clarified without distortion. Because of the unique structure of the synthetic paper of this invention it can be clarified or transparentized by rapid treatment under heat and pressure, even at temperatures above the softening point of the plastic. The treatment can be so rapid that there is little or no heat transfer from the press to the film with the result that there is substantially no distortion of the film. This unexpected property of the products of this invention may be utilized in preparing gracefully patterned printed copy with transparent and opaque areas beautifully interlaced. Such products are easily produced utilizing properly registered heat pressure embossing rolls or flat presses.

While the products of this invention are described herein principally with reference to their unique properties for high speed printing it will be recognized that they are also useful for any of the wide variety of purposes for which ordinary paper has heretofore been utilized. Additionally, by variations of the basic processes to be described hereinafter it is possible to produce novel, special purpose products. They are useful when properly coated as master copy sheets for use in offset printing.

The products of this invention for use as synthetic paper are the conventional paper widths. They are normally from about 15 to about 300 microns thick, although wider variations are possible. The total thickness of the opaque layer should normally not be more than 100 microns, and the thickness of the untreated layer will normally be at least one third of the total thickness. It may extend up to any value consistent with a total thickness of at least 5 microns for each surface layer. A typical product of the invention would be one having, top and bottom opaque layers each 5 microns in width and an untreated middle layer 5 microns in width. Another would have bottom and top treated layers each 100 microns thick and an untreated layer 100 microns thick. Still another would have one surface layer 10 microns thick and a second untreated layer 20 microns thick. It has been discovered that products corresponding to these dimensions best combine the features of surface bonding strength and ink receptivity without concurrent loss of dimensional stability of the thermosplastic film.

Thermoplastics useful in the process of this invention for the preparation of the novel products hereof include all of those thermoplastics which can be formed into a film and affected by liquid treatment to be hereinafter described. They include, for example polyvinyl plastics, particularly polyvinyl chloride and copolymers of vinyl chloride with vinyl esters such as vinyl acetate and with vinylidene compounds particularly vinylidene chloride. They include also polyvinyl polymers based on styrene and various known copolymers thereof. Palyolefins particularly polyethylene and polypropylene can also be employed. There may be mentioned by way of further examples, films formed from polyamides, polyesters, polyurethanes, natural and synthetic rubbers, polymers based on cellulose and the like. The films may be plasticized or unplasticized. They may be stretch oriented or untreated in this respect. Each of these films when treated in accordance with the process of this invention can be converted to the useful products described and claimed herein. Of the many products which are available as a result of the invention, those based on polystyrene, polyvinyl chloride and polyethylene are preferred since the raw materials are readily available at reasonable cost and since the products produced have especially advantageous properties for a number of applications.

There are two basic processes by with the novel products of this invention are prepared. One is the multibath treatment described in detail and claimed in the above identified copending application Ser. No. 610,481. The other is the unibath treatment described in detail and claimed in the above identified application Ser. No. 789,941. Many variations of these basic processes are possible to produce useful products. The feature of the invention is that the thermoplastic film to be converted to synthetic paper is treated first with a liquid, or liquid mixture which dissolves and swells the plastic and thereafter with a liquid or liquid mixture coagulating agent which is miscible with the original liquid. When these two process steps are carried out under the specialized conditions, described in the aforesaid patent applications, the novel products of the invention are produced.

In the process aspect of the invention the plastic is first treated with a liquid which has the effect of dissolving and swelling the plastic film. If the conditions of treatment are selected so that no more than about 0.3% by weight of the plastic film dissolves, the film is thereafter treated with a coagulating liquid and dried. If the conditions of treatment are selected so that more than about 0.3% by weight of the thermoplastic polymer dissolves the product is thereafter treated in at least one, and preferably several coagulating baths under conditions which are successively less rigorous. For convenience these procedures have been referred to as the dissolving process and the swelling process since these are the aspects which are most significant in each procedure, although in each procedure both processes take place. In each procedure there is some dissolving and some swelling of the polymer. In the first or unibath procedure the dissolving is kept at defined level so that in the subsequent coagulation step a microporous opaque layer having the required properties is formed. In the second or multibath procedure the extent to which the polymer is permitted to dissolve is of lesser importance since the swelling and coagulation are controlled to produce a microporous layer having the required properties.

As will be appreciated by those skilled in the art, any of a wide variety of dissolving or swelling agents can be used in combination with a similarly large variety of miscible coagulating agents. The following lists may be a helpful guide in selecting agents for particular thermoplastics. They are not however comprehensive lists, nor are they intended to be since many other liquid combinations can be readily selected on the basis of the criteria herein described.

The following table shows the maximum solubility of a variety of thermoplastics at the temperature indicated in a number of liquids and liquid mixtures. These agents when utilized in combination with appropriate swelling agents are useful in the unibath procedure. Solubility is given by weight based on total weight.

TABLE I

| PLASTIC | AGENT | TEMP. | SOLUBILITY % |
|---|---|---|---|
| High Inpact Polystyrene | Acetone | 30°C | 0.044 |
| | MIBK (85) : MeOH (15) | 30 | 0.036 |
| | MIBK (85) : MeOH (15) | 40 | 0.194 |
| | MIBK (80) : MeOH (15) | 30 | 0.009 |
| | MIBK (70) : MeOH (30) | 30 | 0.002 |
| General Purpose Polyestyrene | Acetone | 20 | 0.037 |
| | MIBK (80) : MeOH (20) | 30 | 0.031 |
| | MIBK (80) : MeOH (20) | 40 | 0.066 |
| | MIBK (80) : MeOH (20) | 50 | 0.202 |
| | MIBK (70) : MeOH (30) | 30 | 0.001 |
| Polyvinyl Chloride | THF (85) : Water (15) | 30 | 0.201 |
| | THF (80) : Water (20) | 30 | 0.004 |
| Polyvinyl Chloride | CYX (90) : Water (7.5) : MeOH (7.5) | 30 | 0.198 |
| | CYX (80) : Water (10) : MeOH (10) | 30 | 0.072 |
| | THF (85) : Water (15) | 30 | 0.201 |
| | THF (80) : Water (20) | 30 | 0.004 |
| | Cyclohexanone (85) : Water (7.5) : MeOH (7.5) | 30 | 0.198 |
| | Cyclohexanone (80) : Water MeOH (10) | 30 | 0.072 |
| Polymethyl Methacrylate | Acetone (80) : Water (20) | 20 | 0.118 |
| | Acetone (80) : Water (20) | 30 | 0.308 |
| | Acetone (70) : Water (30) | 20 | 0.034 |
| | MEK (40) : MeOH (60) | 20 | 0.223 |
| Vinyl Chloride - Vinylidene Chloride Coplymer | THF (90) : MeOH (10) | 20 | 0.359 |
| | THF (80) : MeOH (20) | 20 | 0.181 |
| | THF (70) : MeOH (30) | 30 | 0.094 |
| | Dioxane (90) : MeOH (10) | 30 | 0.075 |
| | Dioxane (80) : MeOH (20) | 30 | 0.032 |
| Cellulose Triacetate | Acetone (100) | 30 | 0.119 |
| | Acetone (100) | 40 | 0.422 |
| Polypropylene | Carbon tetrachloride (100) | 60 | 0.029 |
| | Carbon tetrachloride (100) | 70 | 0.031 |

Typical coagulatiing agents useful in the practice of the invention by the unibath method are illustrated in the following table.

TABLE II

| Film resin | Swelling agents | Coagulating agents |
|---|---|---|
| Polystyrene | MIBK-MeOH, CYX-MeOH, Acetone | Water, ROH |

TABLE II-Continued

| Film resin | Swelling agents | Coagulating agents |
|---|---|---|
| Polyvinyl chloride | THF-Water, CYX-water | Water, ROH |
| Polymothyl mothacrylate | Acetone-water MEK-MeOH | Water, ROH |
| Polyvinyl chloride-polyvinylidene chloride copolymer | THF-MeOH Dioxane-MeOH | Water, ROH |
| Cellulose triacetate | Acetone | Water, ROH |
| Polypropylene | Carbon tetrachloride | ROH |

In the above tables and throughout the balance of this specification MIBK means methyl isobutyl ketone, MeOH means methyl alcohol, THF means tetrahydrofuran, CYX means cyclohexanone, and ROH means a lower alcohol.

The coagulating agents in Table II may be used in association with the liquids and liquid mixtures listed in Table I. Other combinations may also be employed. It will be apparent from the above tables that 0.3% solubility is not an absolute limitation in the practice of the unibath method. Vinyl chloride — vinylidene chloride copolymer has a solubility limit of 0.359% at 20°C in THF (90) : MeOH (10) and is capable of forming a product within the scope of the invention when utilized with an appropriate coagulating agent. It is to be expected that with such diverse polymers, dissolving agents and coagulating agents it would not be possible to fix an absolute solubility limit. However, surprisingly, the optimum solubility limit with any polymer or liquid combination does not vary appreciably from 0.3% and it is, of course, specifically intended to include such minor variations within the scope of this invention as equivalents of 0.3%.

It will be understood that where reference is made to a treating bath in this application it is contemplated that the film may be treated by dipping in the selected liquid, by spray coating, knife coating or equivalent procedure.

It has been found in the practice of the unibath method that a proportional relationship exists between the temperature and time of operation of the liquid agents of the invention. That is to say, the longer the film remains in the dissolving bath and the higher the temperature (while staying within the solubility limits) the thicker will be the resulting opaque layer. Accordingly the choice of liquid agents and the temperature and time will vary within relatively wide limits depending upon the intended use and the particular polymer and liquids. Generally speaking the time and temperature for the first step will vary from about 1 to 10 seconds and from about 20°C to 70°C. The equivalent values for the coagulation treatment are from about 10 to 60 seconds at about 20°C to 30°C. For the production of synthetic paper useful as a tracing paper which is essentially translucent and has an opacity of about 50% as measured on the standard Japanese Industrial Standard scale it is usually feasible to operate at the lower end of the above ranges. To increase the opacity, say to about 90%, the upper ends of the ranges are most useful. For synthetic paper which is intended for printing only on one side the opacity is preferably about 60% to 75%, and for printing on both sides it is about 85% to 90%.

In the multibath process for preparing the novel products of this invention, ultimate control of the opacity and other properties of the final product is achieved by treating the film first with a swelling or dissolving liquid and allowing the amount of dissolved polymer to exceed 0.3% or its equivalent and thereafter treating the film with liquids or liquid mixtures of lower swelling ability or increased coagulating ability until the final treatment is with a liquid which effects the final degree of coagulation or microsporosity.

The liquids utilized in the intermediate treatment may include the following:
1. A swelling agent used in the first-stage treatment to which a non-swelling agent has been added to lessen the swelling power;
2. A swelling agent which is different in kind from, and lesser in swelling power than, the swelling agent used in the first-stage treatment, either independently or mixed with a non-swelling agent;
3. A swelling agent used in the first-stage treatment with which a swelling agent of lesser swelling power has been mixed; and
4. The same liquid used in the first-stage treatment but at a lower temperature.

The liquids utilized in the intermediate procedures are selected for their miscibility with the original swelling agent.

Typical liquids which may be used as swelling agents, or in appropriate mixtures or at appropriate temperatures as intermediate agents are listed in Table III.

TABLE III

| | |
|---|---|
| Polyvinyl chloride | tetrahydrofuran, cyclohexanone, dioxane, methyl ethyl ketone |
| Vinyl chloride-vinyl acetate copolymer | tetrahydrofuran, cyclohexanone, dioxane, methyl ethyl ketone |
| Vinyl chloride-vinylidene chloride copolymer | tetrahydrofuran, cyclohexanone, dioxane, methyl ethyl ketone |
| Polystyrene | acetone, methyl ethyl ketone, methyl butyl ketone, carbon tetrachloride, benzene, xylene, toluene, solvent naphtha, cyclohexanone, ethyl acetate, butyl acetate |
| Polyacrylonitrile | dimethyl sulfoxide; dimethyl formamide |
| Polymethyl methacrylate | acetone, methyl ethyl ketone, benzene, xylene, etc. |
| Polyethylene | carbon tetrachloride, benzene, toluene, xylene |
| Nylon | phenol, cresol |
| Polyurethane | acetone, carbon tetrachloride, ethylene dichloride |
| Polycarbonate | acetone, benzene, xylene, ethylene dichloride |
| Rubber hydrochloride | benzene, xylene, cyclohexanone, ethyl acetate |
| Cellulose diacetate | ethyl acetate, acetone, methyl ethyl ketone |
| Cellulose triacetate | methyl acetate, methylene dichloride, chloroform tetrahydrofuran |
| Nitrocellulose | ethyl acetate, acetone |

Typical examples of non-swelling or coagulating agents include water and alcohols such as methanol, ethanol, propanol, and ethylene glycol; ethers such as ethyl ether, hydrocarbons containing up to about seven carbon atoms, especially pentane, hexane, heptane and the like.

The treatment times and temperatures will be selected in accordance with the same principles described above in connection with the unibath treatment. They will generally be of the same order of magnitude, and will, of course, vary appreciably with the particular polymer film and the treating liquids.

The treating liquid, whether swelling or coagulating agents, may be used singly or in combination. One combination which may be employed is to combine the swelling, intermediate or coagulation agents with water. For example, a product of the invention can be prepared by treating polyvinyl chloride film with either of the following combinations at room temperature for the periods indicated:

TABLE IV

| SWELLING AGENT | TIME | COAGULATING AGENT | TIME |
|---|---|---|---|
| THF (96) : Water (4) | 4 sec. | MeOH | 30 sec. |
| CYX (80) : MeOH (10) : Water (10) | 5 | MeOH | 30 |
| CYX (80) : MeOH (10) : Water (10) | 5 | MeOH (70) : Water (30) | 30 |

In either procedure, whether unibath or multibath, the final step is a drying step in which the film is dried at temperature below the softening point of the thermoplastic polymer so that there is no distortion of the film.

By any of the above treatments there results a synthetic paper of the invention in which each treated surface is characterized by the presence of large numbers of micropores which have the effect of increasing light scattering and therefore opacity. The external appearance is that of fine grade cellulose paper. The size of the pores, the opacity of the surface and the translucense of the product may be adjusted optionally operating in accordance with the principles described. When these principles are followed there results novel products of the character described herein principally characterized by at least one opaque microporous surface integral with a non-treated segment or layer having the character of the original polymer film, i.e., it is not opaque and if viewed in cross-section would evidence no microporosity compared with the original polymer film.

As indicated above, there are a number of variations which can be made in the basic unibath and multibath processes to even further improve the resulting products. The principal procedures are drying and pressing.

The intermediate drying is not, as is the final drying, intended to drive out substantially all of the liquid in the film. The time and temperature utilized will vary with the film, the liquid and the degree of dryness desired. Optimum conditions can readily be determined. Normally a film after the initial dissolving or swelling treatment will contain from about 20 to 120 grams per square meter of adsorbed liquid. The intermediate drying treatment will be designed to remove from about 30% to 80% by weight of the original liquid or of any liquid present in the film after a previous step. The drying is best effected by blowing air towards both sides of the film. One advantageous effect of such drying treatment is to increse the gloss of the product and to increase the surface bonding strength of the opaque layer to the untreated layer. Drying may advantageously be employed between the dissolving and coagulating steps in the unibath procedure. In the multibath procedure it can be employed after swelling, before coagulation or after any of the intermediate treatments. The temperature range for drying is from about 15° C to 50°C.

The gloss of the final product can also be improved utilizing an intermediate pressing step. In this step the film is pressed against a smooth surface while the film still has plasticity as a result of treatment with the initial swelling or dissolving agent or after one of the intermediate baths. Such pressing can also be used to impress a rough surface on the opaque layer. In either event the pressing surface is preferably pretreated as tetrafluoroethylene or a silicone.

The pressing step should be carried out while the surface of the film has sufficient plasticity or fluidity to be affected by pressure. However, because the film is plastic it must be handled carefully so that it does not lose its shape. Pressing can take place after initial swelling or dissolving, after intermediate drying or after any one of the intermediate treatments in the multibath process. The effect of the pressing treatment is to remove liquid adsorbed in the opaque layer or layers. In this respect it is similar to the drying treatment. However it is best to remove slightly less liquid, say for example 25% to 75% by weight. The pressure used in the minimum which can be effectively employed to achieve the desired result.

A very convenient and useful procedure is to expose the film to the action of a coagulating liquid as it is being removed from the pressing surface.

As will be apparent from the above, there are many different procedures for producing the novel products of this invention while operating within the above defined parameters. If one refers to the original treatment of the unibath process as A*, the original treatment of the multibath process as A, the multibath treatment as $B_1$, the drying treatment as $B_2$, the pressing treatment as $B_3$, the coagulation treatment as C and the final drying treatment as D, some of the combinations which can be employed may be identified as:

| | |
|---|---|
| A*-C-D | A-$B_3$-$B_2$-$B_1$-C-D |
| A*-$B_2$-C-D | A-$B_3$-$B_1$-C-D |
| A*-$B_3$-C-D | A-$B_2$-$B_1$-C-D |
| A-$B_1$-C-D | A-$B_1$-$B_3$-$B_2$-C-D |
| A-$B_1$-$B_2$-C-D | A-$B_2$-$B_1$-$B_2$-C-D |
| A-$B_1$-$B_3$-C-D | A-$B_2$-$B_1$-$B_3$-C-D |

These sequences are above only, and many other sequences can be usefully employed to produce the products of the invention. As described above, the minimum effective treatments are A*-C-D or A-$B_1$-C-D.

In addition to the abovee there are many optional effects and a wide variety of products which can be obtained in accordance with the invention.

There are two procedures for producing synthetic papers with water marks. A watermark is pattern which is visually discernible because of a slight difference in opacity between marked and unmarked areas. With ordinary paper it is produced utilizing a dandy-roll.

In one process according to this invention the film is patterned in advance by treatment with either a swelling or a coagulating agent. After such treatment the film is either more or less susceptible to the action of the original solution or swelling treatment, i.e., the A* or A treatment, in those areas which have been marked. The result of the changed susceptibility is that there is a difference between the marked and unmarked sections with the result that the pattern, i.e., the watermark becomes visible.

The liquids used for the process may be broadly referred to for convenience as swelling or non-swelling agents. The pretreatment liquids should be miscible with the liquids used in the main process sequence. If a swelling agent is used in the pretreatment it is preferable that it differ from the A* or A agent used in the main treatment. If non-swelling agents are employed in the pretreatment it is preferred that they have some degree of viscosity as is the case with fluid paraffins, glycerine and the like, but it is not essential. If liquid of low viscosity such as methanol or ethanol are employed the viscosity may be increased by the addition of polyvinyl acetate or other water soluble polymer. If water is used the surface tension should be lowered by the addition of a surfactant to aid in wetting the polymer film. Additionally the viscosity should be increased by the addition of a water soluble polymer such as polyvinyl alcohol.

If the film is patterned in advance by utilization of a swelling agent pretreatment, then, as a consequence of such pretreatment the swelling in the patterned area is greater than that in the unpatterned area. Therefore there results the difference in opacity above mentioned.

If the pretreatment is with a non-swelling agent, the swelling power of the A* or A agent is decreased with a result that there is less swelling in the patterned areas than in the unpatterned areas. Again there is a difference in opacity.

Another method for obtaining a watermark is to use an embossed plate in the pressing treatment, the so called $B_3$ treatment described above. This procedure, although not limited thereto, is most conveniently carried out subsequent to an intermediate $B_1$ step. In this condition the film is still sufficiently plastic to receive an impression, but yet not so fragile that there is danger of deforming or otherwise damaging it. In any event the effect of such treatment is to compress a number of pores in a predittermined pattern. These compressed pores will affect light in a different manner than the uncompressed pores so that the predetermined pattern or watermark becomes visible.

The formation of the watermark by this procedure requires no special equipment. It can be performed by passing the softened film into the nip of a pair of rolls, for example an engraved metal roll and a rubber or cotton roll.

Various additives may be incorporated into the final products of the invention for special purposes. These include dyes, scents, surfactants, antistatic agents and blowing agents, for example.

Dyes in any effective concentration may be incorporated in any of the treating liquids used in the invention. The dyes will penetrate deep into the opaque layer thus producing very fast and true colors. Colored products are especially useful when patterns are to be produced by clarifying a product utilizing heat and pressure. The presence of the color affords clearer contrast and allows the production of most attractive patterns.

Antistatic agents can be added in effective amounts in the same manner as the dyes are added. Typical antistatic agents may be cationic, anionic or non-ionic as in the case of surfactants. They include for example trimethyl dodecyl ammonium chloride, polyoxyethylene allyl ether phosphate and polyethylene glycol. A typically useful surfactant additive is sodium allyl benzene sulfonate. Surfactant additives are especially useful if the synthetic paper is to be subsequently coated with any material from an aqueous composition, since the surfactant containing products are easily wetted.

The surface hardness of the thermoplastic polymer papers of this invention can be enhanced by dissolving thermosetting resins in the swelling or dissolving agents. This is particularly important for relatively soft thermoplastics such as polyethylene and polyvinyl chloride. Thermosetting resins which are soluble in these agents must be employed and as a result of the treatment they penetrate deep into the opaque layer. Aminoplasts such as melamine formaldehyde or urea formaldehyde resin in a low state of condensation are suitable, although other thermosetting resins can be similarly employed. The amount of thermosetting resin employed is from about 5% to 20% by weight based on the total weight of the original film plus the thermosetting resin.

After the thermosetting resin is incorporated into the opaque layer its condensantion to a thermoset condition is completed by a heat treatment which should, of course, be carried out at a temperature below the flow point of the thermoplastic resin. Thus the optimum temperature, and time of treatment will vary appreciably with the identity of the thermoplastic and thermosetting resins employed. It can be readily determined by reference to standard texts or by a few simple observations.

The addition of blowing or foaming agents to the treating liquids of this invention leads to especially useful products. These products are heat sensitive and, by suitable treatment, letters impressed thereon can be elevated in relief to produce printed material which can be readily distinguished by the sense of finger touch. This paper is useful in the field of braille copy paper for the blind.

For the above-described purpose, film materials having relatively low softening point or melting point such as polyethylene, polyvinyl chloride, polystyrene, rubber hydrochloride, etc., are preferred. When the usual swelling agent treatment is carried out with the object of making such films, selection of a swelling agent having comparatively high swelling power is preferred since it is advantageous for a blowing agent contained in the swelling agent to penetrate as deep as possible into the interior of film base.

The blowing agent should be soluble in the swelling agent employed, and its choice is dependent upon the softening or melting point of polymer materials. Blowing agents having heat decomposition temperature of less than 150°C such as mentioned below are preferred. The amount of such blowing agent should be appreciably more than 0.5% by weight of the treated film, preferably about 2% to 20% based on the total weight. The blowing agents having little or no color are preferred. Suitable foaming agents include, for example, tert-butylamine nitrite, guanidine nitrite, 1,1'-dithiodiformamidine, N-nitro-N'-cyclohexyl urea, diazoaminobenzene, 2,2'-azobisisobutyronitrile, 1,1'-azobiscyclohexanecarbonitrile, diethylaminosulfonyl hydrazide, benzenesulfonyl hydrazide, p-tert-butylbenzoyl azide, N,N'-dimethyl-N,N'-dinitrosoterephthal amide, 1-methyl-3-phenyl-triazine, benzenediazonium chloride, diazoacetoamide, azodicarboamide, diethylazodicarbonate, thiophenylhydrazone, trinitrosotrimethylenetriamine, carbamylazide.

After the film surface has been treated with a swelling agent containing such blowing agent, it is coagulated by the non-swelling agent and dried according to the usual procedure in this invention.

When special heat-sensitive copying is performed using thus produced films containing a blowing agent, any heat-sensitive office copying machine of the type now widely in use can be employed without modification in the same manner as in the case of ordinary heat-sensitive copy paper. Namely, when the treated film is placed on the original paper having lines or drawings thereon and is passed through the machine, an opaque, solid, embossed copy is obtained, because the heat from the heater in the machine initiates selective heat absorption in the area of lines or drawings and the heat transmitted onto the film causes the blowing agent to function in the area exactly corresponding to the original figure, thus causing the area to swell. In order to further facilitate foaming in the copying operation it is advisable to cover the film with a mesh screen. A suitable mesh size is selected on the basis of the size of the respective objects to be copied.

The various treatments described above are carried out under condition such as to efficiently produce the desired results without shrinkage or other deformation of the film. This is sometimes difficult in those instances where, for some special reason, only one side of the film is to be treated to produce an opaque layer. For this purpose a special technique has been devised. In the technique a bag-shaped polymer film is formed by inflation for instance, or folding a piece of film over on itself, or superposing two pieces of film, or by closely contacting them mechanically or electrostatically. The thus prepared film is then treated with an A or A* agent. When pieces of the film properly contacted by either of the above methods are dipped in a swelling or dissolving agent for a suitable period of time, the agent penetrates only slightly inside of the peripheral area by capillarity, with the favorable result of causing said area to be solvent-fused or sealed. With the peripheral part thus fused or sealed completely together, the swelling agent cannot penetrate into the interior, and the two pieces of film can thereby be treated only on their respective outer surfaces. After treating in the above manner, the treatment is continued as described above to obtain two flat pieces of film seated in bag-like form with only the one surface of each formed into an opaque layer.

It would be expected that each piece would shrink when the sealed area is cut off. This is prevented in accordance with this invention by heat treatment for a period of about 1 to 30 minutes at an appropriate temperature below the softening temperature before the sealed area is trimmed off and flat film without any curls or wrinkles is obtained. In the above heat treatment any ordinary heating technique may be employed so far as the temperature is maintained below the melting point of polymer film material used.

The products of this invention can be further improved especially with respect half tone reproduction by calender treatment in accordance with standard procedures. This improvement can be achieved without appreciable loss of ink receptivity with the result that printed image is very sharp with superior ink gloss.

Preferably pressure treatment is performed by means of a calender consisting of more than two rolls, especially by supercalender composed of cotton rolls and steel rolls. Polymer films have little plasticity below their softening temperatures, so that it is difficult to impart smoothness to their surfaces by application of pressure. The products of this invention, however, have pressure-sensitive micropores in the opaque layer which can be crushed by pressure. It is thus possible to crush some of the micropores and increase surface smoothness of the products even at room temperature, but higher treating temperatures below the softening point of the products are preferred for imparting surface smoothness. Since pressure treatment causes partial destruction of the minute pores, a certain degree of loss of film opacity is unavoidable and this is, of course, undesirable from the point of view of printability and ink receptivity. It is however an advantageous feature when it is desired to intersperse translucent areas with opaque areas in the production of attractive designs. Thus as is described and illustrated in the examples patterned, clarified areas, whether merely printing or an intricate design can be formed on the synthetic paper in areas where the opacity has been substantially destroyed.

The following non-limiting examples are given by way of illustration only.

EXAMPLE 1

A commercially available high-pressure polyethylene film was dipped in toluene by keeping in a first bath at 50°C for a period of 5 seconds, and thereafter was dipped in ethyl alcohol in a second bath for a period of 10 seconds and was air-dried. By this treatment the opacity of the film was improved.

EXAMPLE 2

A biaxially oriented film of polyvinyl chloride (trade name, "Neuphan" from Toyo Rayon Co.) was first dipped in acetone for 5 seconds and next in water for 10 seconds and then air-dried to improve its opacity.

EXAMPLE 3

Both biaxially oriented polystyrene film (trade name "Sant clear" from Mitsubishi Monsanto Co.) and unoriented polystyrene film prepared by casting on a glass plate were dipped in a first bath comprising 95% aqueous acetone solution for 1 second and then in a second bath comprising water for 10 seconds and thereafter air-dried by air to obtain products from both films having excellent opacity and writing quality.

EXAMPLE 4

Cellulose diacetate film (from Fuji Film Co.) was dipped in a first bath of acetone for 1 second and in a second bath of isopropyl alcohol for 10 seconds and thereafter air-dried by air to obtain a film having good opacity and good writing quality.

EXAMPLE 5

A plasticized polyvinyl chloride film of $50\mu$ in thickness was dipped in a mixed solution of 90 parts of tetrahydrofuran and 10 parts of methanol for 3 seconds at room temperature, then taken out of the dipping bath and air-dried for 20 seconds at room temperature, subsequently further dipped in methanol for 30 seconds at room temperature, and thereafter air-dried. The resulting film, as compared with a film treated without inserting the drying process, was particularly superior in surface bonding strength and gloss and made no great difference in brightness and opacity, as shown in the following table.

|  | Surface Bonding Strength | Gloss (%) | Brightness (%) | Opacity (%) |
|---|---|---|---|---|
| Film treated by inserting drying process A | does not pick with No. 16 Tack ink | 60 | 91 | 81 |
| Film treated without inserting drying process B | picks with No. 12 Tack ink | 10 | 92 | 83 |

EXAMPLE 6

A: A biaxially-oriented polystyrene film of $50\mu$ in thickness (Styrex made by Mitsubishi Jushi Co.) was dipped in a mixed solution of 1 part of carbon tetrachloride and 1 part of acetone for 1 second at room temperature, then taken out of the dipping bath and air-dried for 5 seconds at room temperature, subsequently further dipped in methanol for 60 seconds at room temperature, and thereafter air-dried. In this case, too, like in the preceding Example, a film having superior surface bonding strength and gloss was obtained.

B: A high-pressure polyethylene film of $50\mu$ in thickness was dipped in toluene kept at 90°C for 2 seconds, then taken out of the dipping bath and dried for 5 seconds at 50°C, subsequently further dipped in ethanol for 30 seconds, and thereafter air-dried. In this case, too, the improvement in surface bonding strength was evident.

EXAMPLE 7

A plasticized polyvinyl chloride film of $50\mu$ in thickness was treated under the following conditions and thereafter dried to obtain four samples described in the table hereunder. In this case, the first-stage treatment was carried out in the vicinity of its limit, since, if the treating time is prolonged, the film would get out of shape. Provided that the surface treatment was, in all cases, carried out by the dipping method.

|  | First Stage | Second Stage | Third Stage |
|---|---|---|---|
| Sample A | tetrahydrofuran 20°C, 7 seconds | None | methanol 20°C, 30 seconds |
| Sample B | Same as above | tetrahydrofuran 4 parts methanol 6 parts 20°C, 5 seconds | Same as above |
| Sample C | Same as above | acetone 20°C, 2 seconds | Same as above |
| Sample D | Same as above | acetone 5 parts methanol 5 parts 20°C, 5 seconds | Same as above |

The properties of the resulting films are as shown in the following table. As is clear from the table, the samples B, C and D subjected to the treatment according to this invention, as compared with the untreated sample A, were particularly superior in surface strength and also improved in brightness and opacity.

| Sample | Surface Bonding Strength | Gloss (%) | Brightness (%) | Opacity (%) |
|---|---|---|---|---|
| B | does not pick with No. 16 Tack ink | 8 | 95 | 86 |
| C | Same as above | 7 | 94 | 84 |
| D | Same as above | 8 | 93 | 84 |

EXAMPLE 8

The same film as in Example 7 was subjected to the following four-stage dipping treatment and thereafter dried to obtain a film having surface bonding strength which does not pick with No. 16 Tack ink.

| First Stage | tetrahydofuran | 95 parts |
|---|---|---|
|  | methanol | 5 parts |
|  | 17°C, 6 seconds |  |
| Second Stage | tetrahydrofuran | 6 parts |
|  | methanol | 4 parts |
|  | 17°C, 3 seconds |  |
| Third Stage | tetrahydrofuran | 3 parts |
|  | methanol | 7 parts |
|  | 17°C, 5 seconds |  |
| Fourth Stage | methanol |  |
|  | 17°C, 30 seconds |  |

EXAMPLE 9

A high-pressure polyethylene film of $50\mu$ in thickness was first dipped in toluene kept at 90°C for 2 seconds, thereby surface-treated up to the limit, then dipped in toluene kept at 50°C for 5 seconds, further dipped in methanol for 30 seconds at 20°C, and thereafter air-dried. The resulting film (Sample A), as compared with a film not treated in the toluene kept at 50°C (Sample B), was superior in surface bonding strength, brightness and opacity.

EXAMPLE 10

A biaxially-oriented high impact polystyrene film of $100\mu$ in thickness (made by Mitsubishi Monsanto Co.) was dipped in methyl isobutyl ketone kept at 20°C for 5 seconds, thereafter held between two highly-polished glass plates and lightly pressed, then released from the glass plates, dipped in methanol kept at 20°C for 30 seconds and air-dried. The results of comparison with a control article not pressed onto the glass plates area as shown below.

|  | Gloss (%) | Gloss after Indigo-Blue Ink Printing (%) |
|---|---|---|
| Processed Article of This Invention: A | 93 | 51 |
| Control Article: B | 20 | 37 |

EXAMPLE 11

A cellulose triacetate film (made by Fuji Film Co.) having a thickness of $80\mu$ was dipped in a mixture of one part by weight of methyl acetate and one part by weight of acetone at the temperature of 20°C for a period of 5 seconds, and then one surface of the film was pressed slightly onto a glass plate. After being released the plate, the film was dipped in petroleum-benzene for a period of one minute to secure complete coagulation. Thus an opaque film having an excellent gloss was obtained as in the previous examples.

EXAMPLE 12

A biaxially-oriented polystyrene film (Styrex, made by Mitsubishi Jushi Co.) having a thickness of $50\mu$ was first dipped in a mixture of 9 parts acetone and 1 part carbon tetrachloride for a period of 2 seconds at room temperature, and then dipped in isopropanol also at room temperature. While the film was still dipped in isopropanol, comparatively little pressure was applied to it by means of a stamping roll. A good watermark pattern was printed when application of the pressure was performed within 3–15 seconds after immersion of the film started.

EXAMPLE 13

A polyethylene film having a thickness of $50\mu$ was dipped in a prepared liquid consisting of 100 parts toluene having dissolved therein 10 parts polystyrene (trade name, "Stylon 666" from Asahi-Dow Co.), 5 parts nitrile butadiene rubber (separated and modified from "Hycar latex 1552," Nippon Zeon Co.) and 5 parts butylated melamine resin (trade name, "Yuban 20S–Bu65" from Toyo Koatsu Co.) for a period of 3 seconds at room temperature, air-dried for 15 seconds, and then coagulated by dipping in methanol at room temperature for 30 seconds. Thereafter the film was dried and heat-treated for 10 minutes at 80°C. A film of high opacity having uniformly and closely gathered fine particles on the surface was obtained. The surface layer thus formed had a high gloss, showed firm resistance to the rubbing action of abrasive paper, and was strongly adhered to base material. In addition, the film surface was able to be marked with pen or pencil, and was easy to be printed upon.

EXAMPLE 14

A sample was prepared by dipping a biaxially-oriented polystyrene film (trade name, "Styrex" from Mitsubishi Jushi Co.) having a thickness of $50\mu$ in a solvent mixture of 65 parts benzene and 35 parts methanol containing dissolved therein 2 parts of diazoaminobenzene for a period of two seconds at 20°C and drying. This treatment was followed by dipping in methanol for 30 seconds at 20°C and air-drying at room temperature. The sample was inserted (A) between a newspaper and a 100 mesh silk screen, copied by "Thermofax" Copying Machine (from Minnesota Mining Mfg. Co.), and clear copy of letters in white relief were obtained. Next, it was inserted (B) between the original paper printed black with 22 point numeral types and a 19 mesh silk screen, and copied by the same machine. Clearly embossed figures distinguishable by the sense of touch were produced.

EXAMPLE 15

Two pieces of polystyrene film (Styrex, from Mitsubishi Jushi Co.) having a thickness of $50\mu$ were closely contacted and passed through contact rolls positioned in acetone at room temperature at an interval of approximately 15cm with the traveling rate of 3 – 4 seconds. After being dipped in methanol for 30 seconds, they were dried by air current of 70°C, correction treated in a hot-air drier at 70°C for 3 minutes, and then the sealed area (about 2mm wide) of the bag-shaped combination was trimmed off. The thus obtained piece was perfectly free from curls or wrinkles, and was extremely flat; the non-treated surface of the polystyrene film was exactly as it had been before, but on the treated side was produced a uniformly roughened surface, which could be marked even with pencils.

EXAMPLE 16

A high-impact polystyrene film, (prepared from "Diarox" HT resin by Mitsubishi Monsanto, $75\mu$), was dipped in a swelling agent, (solubility: 0.194%), maintained at 40°C and comprising 85 parts by weight methyl isobutyl ketone and 15 parts by weight methyl alcohol for a period of around 2 seconds, and a swellen layer was formed on both sides of said film. Said film was then immediately dipped in methyl alcohol maintained at 25°C for around 30 seconds, and after coagulating, the coagulated layer was dried in the atmosphere at 25°C and a plastic paper-like product of around $110\mu$ thickness was obtained.

The opacity of the paper-like product obtained was 90%, the brightness 96% and the thickness of the layer suitable for recording around $30\mu$ per face, and no powdering or flaking was perceived in surface strength tests by an adhesive tape, (Sekisui cellotape).

EXAMPLES 17 – 18

The following Table shows examples wherein a plastic paper-like product was obtained by the treatment of various plastic films by means of procedures similar to Example 16.

TABLE V

| Film Material | Swelling Agents (pts by wt) | Conditions of treatment Temp. (°C) | Conditions of treatment Time (sec.) | Coagulating agents | Conditions of treatment Temp. (°C) | Conditions of treatment Time (sec.) | Thickness of swollen layer ($\mu$) | Brightness | Opacity (%) | Surface bonding strength | Printing |
|---|---|---|---|---|---|---|---|---|---|---|---|
| (17) High-impact polystyrene (prepared from "Diarex" HT made by Mitsubishi Monsanto, $75\mu$) | MIBK 65: MeOH 35 | 45 | 1 | MeOH | 25 | 30 | 10 | 90.0 | 50 | E | E |

TABLE V -Continued

| Film Material | Swelling Agents (pts by wt) | Conditions of treatment Temp. (°C) | Conditions of treatment Time (sec.) | Coagulating agents | Conditions of treatment Temp. (°C) | Conditions of treatment Time (sec.) | Thickness of swollen layer (μ) | Effects Brightness | Effects Opacity (%) | Effects Surface bonding strength | Effects Printing |
|---|---|---|---|---|---|---|---|---|---|---|---|
| (18) Polystyrene ("Stylex" made by Mitsubishi Jushi, 50μ) | Acetone | 25 | 1 | MeOH | 25 | 30 | 20 | 90.2 | 75 | E | E |
| (19) Polyvinyl chloride ("Neuphan" made by Toyo Rayon, 50μ) | Cyclohexanone 80 : MeOH 10: water 10 | 50 | 1 | MeOH | 25 | 30 | 25 | 89.9 | 80 | E | E |
| (20) Polyvinyl chloride ("Vinyfoil" made by Mitsubishi Jushi, 50μ) | THF 70 : IPA 30 | 25 | 2 | IPA 70 : Water 30 | 25 | 30 | 30 | 92.2 | 85 | E | E |
| (21) Polymethyl methacrylate (100μ) | Acetone 80 Water 20 | 30 | 300 | MeOH | 20 | 180 | 10 | 90 | 50 | E | E |
| (22) do. | acetone 70: 70: Water 30 | 20 | 600 | MeOH | 20 | 180 | 10 | 90 | 45 | E | E |
| (23) do. | MEK 40 : MeOH 60 | 20 | 600 | MeOH | 20 | 180 | 40 | 90 | 92 | E | E |
| (24) Vinyl chloride-vinylindene chloride copolymer ("SARAN" made by Asahi Dow, 20μ) | THF 90 : MeOH 10 | 20 | 0.5 | MeOH | 20 | 30 | 10 | 88 | 85 | E | E |
| (25) Vinyl chloride-vinylidene chloride copolymer ("SARAN" made by Asahi Dow, 20μ) | THF 80 : MeOH 20 | 20 | 0.5 | MeOH | 20 | 30 | 5 | 87 | 82 | E | E |
| (26) do. | THF 70 : MeOH 30 | 30 | 0.5 | MeOH | 20 | 30 | 5 | 83 | 60 | E | E |
| (27) do. | Diaoxane 90 : MeOH 10 | 30 | 1 | MeOH | 20 | 30 | 5 | 85 | 70 | E | E |
| (28) Cellulose triacetate ("Fujitac" made by Fuji Film, 25μ) | Acetone 100 | 30 | 5 | MeOH | 20 | 30 | 5 | 85 | 50 | E | E |

Notes:
1. IPA in the above table represents isopropyl alcohol; other abbreviations are the same as those shown in Table I.
2. The brightness and opacity are shown by the results of tests made by a Hunter multi-purpose reflectometer.
3. The surface bending strengths are shown by the results of pick resistance tests with adhesive tape and the symbol E means little or no picks with inks as high as 12 to 16 tack.
4. In the printing column and as a result of printing tests by an RI tester, those which have printing effects (ink receptivity and the rate of ink drying) as good as or superior to those of an uncoated lrinting paer are shown by the symbol E.
5. The thickness of a swollen layer is measured from a photomicrograph of a cross sectional view.

The following Table VI depicts the processes illustrated in the foregoing examples by the letter symbols defined is this specification. In the case of comparison examples such as Example 5 only the process producing a product of the invention is depicted.

TABLE VI

| Example | Process |
|---|---|
| 1 | A*-C-D |
| 2 | A*-C-D |
| 3 | A*-C-D |
| 4 | A*-C-D |
| 5 A | A-B₂-C-D |
| 6 A | A-B₂C-D |
| 6 B | A-B₂-C-D |
| 7 B | A-B₁-C-D |
| 7 C | A-B₁-C-D |
| 7 D | A-B₁-C-D |
| 8 | A-B₁-C-D |
| 9 | A-B₁-C-D |
| 10 A | A-B₃-C-D |
| 11 | A*-B₃-C-D |
| 12 | A*-B₃-C-D |
| 13 | A*-C-D |
| 14 | A*-C-D |
| 15 | A*-C-D |
| 16 | A*-C-D |
| 17–28 | A*-C-D |

The products of the foregoing examples as are all the products of this invention are characterized by exhibiting little or no picking with inks of number 12 tack or higher, by ink receptivity which makes the sheets suitable for high speed printing, by an opacity of at least 50% to 90% and by a high order of dimensional stability. They are clarified at ambient temperature by scribing with a pencil or similar instrument. They are also clarified without distortion by rapid treatment under heat and pressure. This is accomplished by pressing with a heated press having an image on the heated surface at a temperature of from about 5°C to 35°C above the softening point of the thermoplastic polymer at elevated pressures, for example from about 120 to 200 kilograms per square centimeter for a period of from about one to three seconds. The most suitable conditions will, of course, vary with particular polymer and the thickness of the opaque layer or layers. The opacity of the film can be increased to 100% by incorporating effective amounts of pigments, for example carbon black or titanium dioxide during its manufacture. The properties of the product are not otewise affected by the presence of the pigment.

The pick test utilized in determining the surface bonding strength of the products of this invention is a conventional test performed on the RI Printing Tester manufacturer by Akira Seisakusho Co. of Japan. It is carried out by the recommended procedure.

Ink receptivity is determined on the basis of two standard test, the ink transfer test and the ink drying test. In the ink transfer test a fixed quantity of printing ink is evenly spread on the rubber roll of an RI Tester and test sample strips are pointed. Two measurements are made. One is the quantity of ink remaining on the rubber roll. The other is the color intensity of the printed sample as determined with a densometer which measures the amount of reflected light. If a large amount of ink remains on the rubber roll the transfer is poor.

The other test is the ink drying test. In this test a fixed quantity of printing ink is evenly spread on the rubber roll of an RI Tester and test sample tests are printed. The printed strips are then rubbed with the finger at timed intervals such as 5, 10, 20, 30, 60 and 120 minute intervals. For satisfactory ink drying, the ink should dry and not spread under finger pressure before the elapse of 120 minutes. When this occurs there will be no transfer of image to the back surface of a superposed sheet.

There tests are essentially subjective, but those skilled in the art have no difficulty in understanding and interpreting them so that the ink receptivity of a surface to be printed is rated as either satisfactory or unsatisfactory for high speed printing. The products of the foregoing examples and all of the products of this invention are rated satisfactory for high speed printing.

What is claimed is:

1. A process for producing a dimensionally stable synthetic paper which is a thermoplastic polymer film comprising a first layer substantially free of micropores having at least one ink-receptive, opaque, microporous surface layer integral therewith; said paper being characterized by an opacity of at least 50%, the bonding strength binding said first layer and said surface layer being of sufficient strength so that the product is substantially free from picking when printed with number twelve tack inks; and by a capacity to be clarified without distortion by the application of elevated pressure at temperatures up to 35°C above the softening point of the film during a period of about one to three seconds; which process comprises initially treating at least one surface of a thermoplastic polymer film with a liquid which dissolves and swells the polymer under conditions such that from about 0.001% to 0.3% by weight, based on the total weight, of the polymer dissolves, treating said film with a coagulating agent and thereafter drying said film.

2. A process as in claim 1 wherein the initial treatment is from about 1 to 10 seconds at a temperature from about 20°C to 70°C, and coagulation is effected at a temperature from about 20°C to 30°C during a period from about 10 to 60 seconds.

3. A process as in claim 1 wherein, before coagulating, the product is dried at from about 15°C to 50°C to remove from about 30% to 80% by weight of the liquid remaining on the film after the initial treatment.

4. A process as in claim 1 wherein, before coagulating, the film is pressed to remove from about 25% to 75% by weight of the liquid remaining on the film after the initial treatment.

5. A process as in claim 1 wherein the polymer is a polyolefin.

6. A process as in claim 5 wherein the polymer is polyethylene.

7. A process as in claim 1 wherein the thermoplastic polymer film is a polyvinyl polymer.

8. A process as in claim 7 wherein the polymer is a polyvinyl chloride.

9. A process as in claim 7 wherein the polymer is polystyrene.

* * * * *